United States Patent

Kübler

[15] 3,700,190
[45] Oct. 24, 1972

[54] DAMPING DEVICE FOR SATELLITES
[72] Inventor: Manfred Kübler, Friedrichshafen, Germany
[73] Assignee: Dornier System GmbH, Friedrichshafen/Bodensee, Germany
[22] Filed: Sept. 22, 1970
[21] Appl. No.: 74,316

[30] Foreign Application Priority Data
Oct. 17, 1969  Germany..........P 19 52 280.6

[52] U.S. Cl. ...............................................244/1 SA
[51] Int. Cl. ...............................................B64c 39/00
[58] Field of Search.............244/1 SS, 1 SA; 74/5.5; 308/72

[56] References Cited

UNITED STATES PATENTS

| | | | |
|---|---|---|---|
| 2,045,030 | 6/1936 | Thompson | 308/72 |
| 2,734,384 | 2/1956 | Stewart | 74/5.5 |
| 3,412,955 | 11/1968 | Vilbig | 244/1 SS |
| R26,887 | 5/1970 | McLean | 244/1 SA |

*Primary Examiner*—Edward A. Sroka
*Attorney*—James E. Bryan

[57] ABSTRACT

This invention relates to an apparatus for damping the nutational movements on satellites comprising motor means mounted on the satellite housing, and flywheel means mounted on the motor shaft in a universally movable manner.

6 Claims, 1 Drawing Figure

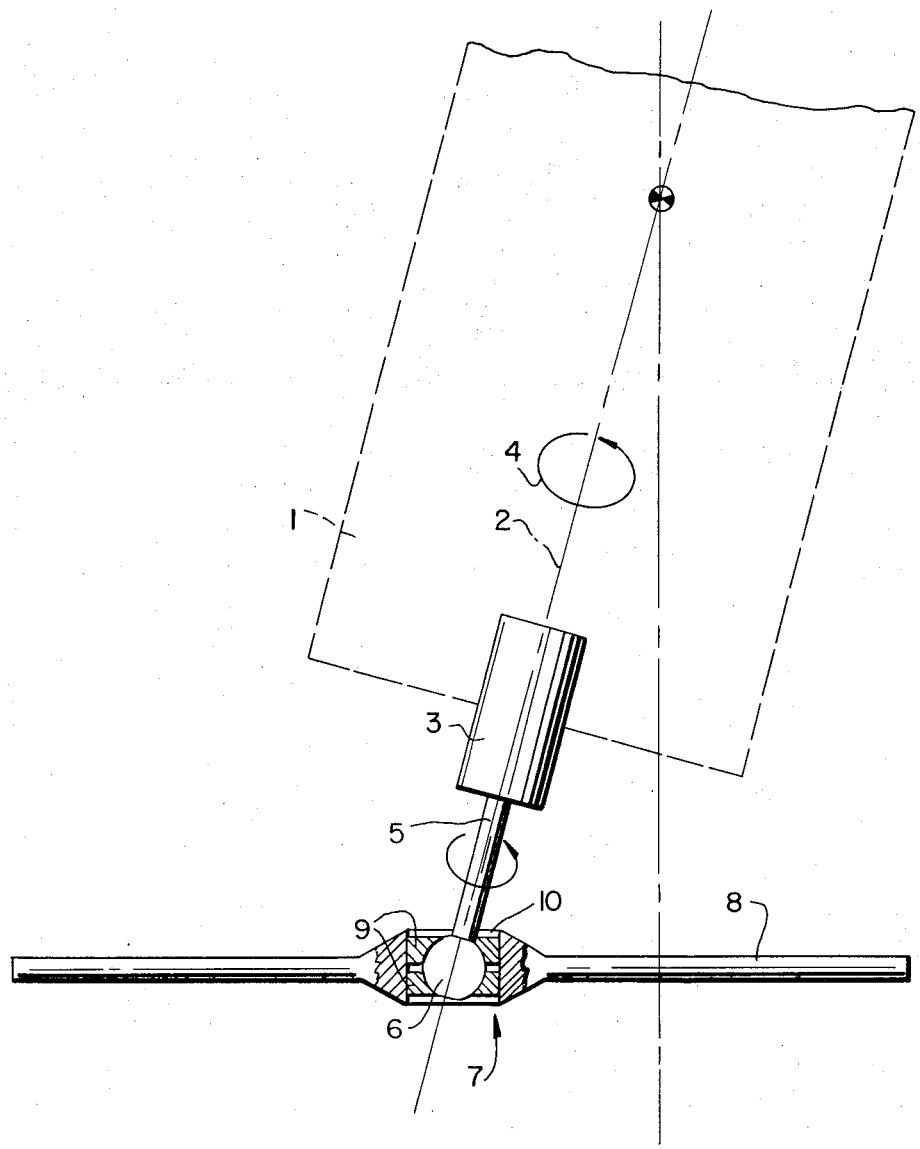

DAMPING DEVICE FOR SATELLITES

The present invention relates to a device for damping the nutational movements on satellites, particularly rod satellites.

This damping device has the purpose of effectively suppressing the nutational movements arising on satellites without impairing the auto-rotational movement of the satellites about the spin axis thereof. In a freely rotating body, the rotational movement takes place about the spin axis at a given twist or spiral movement and with a maximum of kinetic energy. This energy for the twist movement is also referred to as rotational energy. When the kinetic energy of the closed system is converted into other forms of energy due to internal occurrences without any change in connection with the twist, a nutation is built up with regard to the spin movement. This may be brought about, for example, due to hysteresis of bending oscillations. There are superimposed at that time additional oscillating movements about the two transverse axes relative to the rotational movement about the spin axis.

It is known in the art to damp this nutation and to prevent the initiation of such a nutational movement. Kinetic energy is therein conveyed in some way to this satellite system, whereas the twist does not undergo any changes. Two methods have been proven satisfactory in practice, namely by means of a suitable pulsation of cold gas nozzles, or by means of suitably connecting or switching corresponding magnetic coils. The use of cold gas nozzles involves, however, a number of disadvantages which become manifest primarily in an increase of the equipment necessary for acting upon these nozzles. Magnetic coils, on the other hand, depend upon a suitable current source; i.e. the current requirement is greater than the value of the current requirement for the on-board electrical wiring system. A regulating system is necessitated in both cases with a considerable number of structural electronic elements, and this has a negative effect upon the total reliability of the device.

The present invention proposes a simple instrument, designed for damping the nutational movements, which carries out the nutational damping, without specific electronic regulating means, by converting the electrical energy into kinetic energy.

According to the present invention, in the spin axis an electric motor is rigidly connected with the satellite housing and a flat disc-type flywheel is secured in the extension of the rotor shaft to the end thereof so as to be movable by means of a universal joint or on gimbals or by way of Cardan joints. In order to render it possible to secure such a disc-type flywheel being movable by means of Cardan joints to a shaft in a simple manner, it is further proposed, according to another embodiment of the present invention, that a sphere be mounted at the end of the rotor shaft and positioned in a ball cup or socket which is in turn accommodated in the center of the disc. Since the ball cup is simultaneously constructed as a friction lining, the pressure of the friction linings may be varied by means of additional threaded rings. This affords the result that the damping of the nutation may be accomplished in a simple manner by supplying kinetic energy to the satellite system. This is achieved by converting electrical energy into kinetic energy.

The present invention will now be further described hereinafter in one embodiment thereof, taken in connection with the accompanying drawing.

The drawing is a cross-sectional view through a satellite equipped with a nutation damper.

The drawing illustrates a rod satellite 1 and, mounted in the spin axis 2 thereof, a drive motor 3. The drive motor 3 is rigidly anchored to the stellite 1 with respect to the housing thereof. The arrow 4 indicates the direction of rotation of the spin axis during the twist movement of the satellite. In the extension of the spin axis, a rotor shaft 5 projects out of the housing of the drive motor 3. A ball or sphere 6 is mounted at the end of the rotor shaft 5. The ball or sphere 6 is positioned, in turn, within a ball cup or socket 7. The ball cup or socket 7 is positioned in the center of a disc-type flywheel 8. The ball cup or socket 7 consists of two friction linings 9 which, on both sides of the ball or sphere equator, form the ball cup or socket. Threaded rings 10 serve as the closing means of this bearing support. The threaded rings 10 have the purpose of varying the pressure of the friction bearings that is intended to be exerted upon the surface of the ball of sphere 6. The pressure displacement may be effected in a simple manner by a slight twisting of one threaded ring 10. By virtue of this arrangement, the disc is adapted to rotate about the axis of rotation of the motor in an unlimited manner and in addition thereto it also is adapted to rotate about any desired transverse axis within a specific range. The ball or sphere 6 has a polished surface and the friction linings 9 are constructed so as to be replaceable.

When the drive motor, which is an electric motor, is turned on at the rotating and nutating body, the disc-type flywheel executes a nearly genuine spin movement. As a result thereof, relative movements about the transverse axes are produced between the ball or sphere 6 and the ball cup or socket 7. These relative movements take place in a manner such that the frictional moments arising at that time supply kinetic energy, which had been converted from the electrical energy, to the system as a whole. This conversion leads to the nutation damping. When the electric motor is turned off, the disc continues to further execute a nearly genuine spin movement. Because of the fact that the electrical energy is now lacking, a nutation is stimulated at that time. The nutation damper which appertains to the group of the active dampers, i.e. it requires electrical energy at all times, needs to be actuated only until the untwisting is achieved. The current requirement for this purpose is extremely limited.

It will be obvious to those skilled in the art that many modifications may be made within the scope of the present invention without departing from the spirit thereof, and the invention includes all such modifications.

What is claimed is:

1. An apparatus for damping the nutational movements on satellites comprising motor means mounted on the satellite housing, and flywheel means mounted on the motor shaft in a universally movable manner.

2. An apparatus according to claim 1 in which the motor is an electric motor.

3. An apparatus according to claim 2 in which the flywheel is of the flat disc type.

4. An apparatus according to claim 3 in which the flywheel means is mounted on the motor shaft by a ball and socket joint.

5. An apparatus according to claim 4 in which the socket is constructed as a friction lining.

6. An apparatus according to claim 5 including threaded ring means for varying the pressure of the friction lining.

* * * * *